(12) United States Patent
Hunt

(10) Patent No.: US 7,397,373 B2
(45) Date of Patent: Jul. 8, 2008

(54) SYSTEM AND METHOD FOR SECURITY AND ELECTRONIC ARTICLE SURVEILLANCE

(75) Inventor: Stephen William Hunt, Orwell (GB)

(73) Assignee: Gatekeeper Systems (HK) Limited, Des Voeux Road Central (HK)

( * ) Notice: Subject to any disclaimer, the term of this patent is extended or adjusted under 35 U.S.C. 154(b) by 165 days.

(21) Appl. No.: 10/521,209

(22) PCT Filed: Jul. 16, 2003

(86) PCT No.: PCT/GB03/03114

§ 371 (c)(1),
(2), (4) Date: Jan. 13, 2005

(87) PCT Pub. No.: WO2004/010394

PCT Pub. Date: Jan. 29, 2004

(65) Prior Publication Data
US 2005/0258975 A1    Nov. 24, 2005

(30) Foreign Application Priority Data
Jul. 19, 2002    (GB)    .................................. 0216835.9

(51) Int. Cl.
G08B 13/14 (2006.01)
(52) U.S. Cl. ............... 340/568.1; 340/568.5; 340/572.4
(58) Field of Classification Search ............. 340/568.1, 340/568.5, 568.6, 568.8, 571, 572.1, 572.9, 340/505, 506, 5.92, 10.1; 188/1.12, 111; 280/33.994
See application file for complete search history.

(56) References Cited

U.S. PATENT DOCUMENTS

| | | | |
|---|---|---|---|
| 3,895,368 A | | 7/1975 | Gordon et al. |
| 4,772,880 A | * | 9/1988 | Goldstein et al. ........ 340/568.5 |
| 5,576,691 A | * | 11/1996 | Coakley et al. .......... 340/568.5 |
| 5,881,846 A | * | 3/1999 | French et al. .............. 188/1.12 |
| 6,037,869 A | | 3/2000 | Lace |
| 6,125,972 A | * | 10/2000 | French et al. .............. 188/1.12 |
| 6,127,927 A | | 10/2000 | Durban et al. |
| 6,353,388 B1 | | 3/2002 | Durban et al. |
| 6,362,728 B1 | | 3/2002 | Lace et al. |

(Continued)

FOREIGN PATENT DOCUMENTS

DE    19529456    10/1996

(Continued)

OTHER PUBLICATIONS

International Search Report WO 2004/010394 A2, Jan. 29, 2004.

*Primary Examiner*—Van T. Trieu
(74) *Attorney, Agent, or Firm*—Pearl Cohen Zedek Latzer, LLP

(57) ABSTRACT

A security system and method of providing security in a retail environment or the like, comprising shopping trolleys associated with the retail enviroment fitted with security devices having a receive-only wireless receiver and a processor. The receiver receiving wireless signals transmitted from one or more transmitters located at various locations around the retail enviroment. By analyzing the wireless signals as it passes thereby, the processor of the security device may determine a location and/or a direction of travel of a shopping trolley to which it is fitted. In addition, an alarm signal may be raised if a predetermined signal or sequence of signals is detected.

43 Claims, 2 Drawing Sheets

U.S. PATENT DOCUMENTS

| | | | |
|---|---|---|---|
| 6,486,768 B1 * | 11/2002 | French et al. | 340/5.92 |
| 6,502,669 B1 * | 1/2003 | Harris | 188/1.12 |
| 6,648,103 B2 * | 11/2003 | Scheffer | 188/32 |
| 6,975,205 B1 * | 12/2005 | French et al. | 340/5.92 |
| 7,084,765 B2 * | 8/2006 | Clapper | 340/572.1 |

FOREIGN PATENT DOCUMENTS

| | | |
|---|---|---|
| DE | 19943549 | 3/2001 |
| EP | 1126421 | 8/2001 |
| GB | 2347493 | 9/2000 |
| GB | 2355166 | 4/2001 |
| WO | WO 98-46469 | 10/1998 |
| WO | WO9959112 | 11/1999 |
| WO | WO 01-27891 | 4/2001 |
| WO | WO 04-010394 | 1/2004 |

* cited by examiner

** note: One Way Door Enforce Option

SYSTEM AND METHOD FOR SECURITY AND ELECTRONIC ARTICLE SURVEILLANCE

CROSS-REFERENCE TO RELATED APPLICATIONS

This application is a National Phase Application of PCT International Application No. PCT/GB2003/003114, International Filing Date Jul. 16, 2003, claiming priority of Great Britain Patent Application 0216835.9, filed Jul. 19, 2002, which are both incorporated by reference herein in their entirety.

FIELD OF THE INVENTION

This invention relates to a new security system and a method of providing security.

BACKGROUND OF THE INVENTION

It is well known that it is desirable to provide security for various types of articles. For example, items of value such as clothing or other goods may be stolen from a retail store environment by simply placing them in a shopping trolley and pushing the trolley from the store without payment, a form of crime known as a "push-out" or "push-through".

The primary form of deterrent in common use in such environments is the Electronic Article Surveillance (EAS) system, for example those manufactured by the Sensormatic Electronics Corporation (for example see U.S. Pat. No. 3,895,368: "Surveillance system and method utilising both electrostatic and electromagnetic fields"). In these systems, some form of passive (unpowered) tag is attached to the item to be guarded and normally removed or deactivated at the checkout till. If the item is not taken to a checkout then the tag is not removed, and its presence is detected by loops at the store exit, causing an alarm. The loops generate an alternating electromagnetic and/or electrostatic field with particular characteristics, the presence of a tag then causing perturbations in this field which are detected by the loop, causing an alarm to sound to warn security staff that a theft is occurring.

Various tag-construction and tag-detection methods are employed by these systems, operating at various frequencies from several 100 Hz to 100 kHz and above. An example is acousto-magnetic detection whereby a magnetic material in the tag is caused to resonate by a short burst of excitation from the loops, and this resonance then induces back a small "ringing" current in the loops which causes the alarm to sound. Alternatively the tag may contain a diode which causes re-radiation of received energy at harmonic frequencies, this again being detected by the loops. Other methods are used also. The precise mechanism of these systems is not relevant to the present invention, the important feature being that all such systems use one or more loops located at the store exits which transmit a detectable AC electromagnetic field with defined characteristics.

It is known from DE 195 29 456 to provide transponders or barcodes on individual supermarket trolleys and to monitor movement of the trolleys about a store by interrogating the trolleys electromagnetically or by way of a barcode reader at predetermined locations. This allows an alarm to be generated if a trolley is detected to have been pushed into a store and then out again without passing through a checkout. This system makes no use of existing EAS infrastructures.

A more sophisticated system is known from the present applicant's co-pending International patent application WO 01/27891. There is disclosed a security system for protecting articles, the system comprising at least one Electronic Article Surveillance (EAS) loop, one Emitting Unit and one Detecting Unit attached to each article to be protected (generally a shopping trolley), the Detecting Unit having a detector to detect electromagnetic fields emitted by the EAS loop and the Emitting Unit and to distinguish between them, and an alarm generator for generating an alarm if a predetermined sequence of fields is detected. The system combines existing EAS loops normally present in a retail store with Emitting Units and Detecting Units so as to monitor movement of articles, especially supermarket trolleys, around the retail store. Each Detecting Unit may provide two-way communication with the Emitting Unit and thereby to provide information regarding a location and/or status of the Detecting Unit. Accordingly, each Detecting Unit may require relatively complex and expensive electronics.

WO 98/46469 discloses a security system for preventing theft of shopping trolleys and the like. One wheel of each trolley is provided with a selectively activatable braking mechanism, the mechanism being activated when the trolley passes over a signal cable configured as a loop that generally surrounds a retail environment (e.g. the grounds of a supermarket including its car parking area). The braking mechanism is activated by simply detecting an electromagnetic field generated by the signal cable. The system, however, does not provide any way of monitoring individual trolleys or their locations. Similar systems are disclosed in U.S. Pat. Nos. 6,037,869, 6,127,927, 6,353,388 and 6,362,728.

SUMMARY OF THE INVENTION

According to a first aspect of the present invention, there is provided a security device for a shopping trolley or the like, the device comprising a receive-only wireless receiver incorporating a processor, wherein the receiver is adapted to receive wireless signals from at least one transmitter and the processor is adapted to analyse the received wireless signals so as to determine at least a location of the device within a predetermined spatial area.

According to a second aspect of the present invention, there is provided a security system for a retail environment including a merchandise display area, at least one entrance and at least one exit (which may be the same as the entrance), and at least one shopping trolley or the like, wherein the shopping trolley is fitted with a security device comprising a receive-only wireless receiver incorporating a processor, wherein the receiver is adapted to receive wireless signals from at least one transmitter located in the retail environment and the processor is adapted to analyse the received wireless signals so as to determine at least a location of the device within the retail environment, and wherein at least one transmitter is located at a predetermined choke point within the retail environment past which the shopping trolley or the like must travel before leaving through the exit and/or entrance.

According to a third aspect of the present invention, there is provided a method of providing security in a retail environment including a merchandise display area, at least one entrance and at least one exit (which may be the same as the entrance), and at least one shopping trolley or the like, wherein the shopping trolley is fitted with a security device comprising a receive-only wireless receiver incorporating a processor, wherein the receiver receives wireless signals from at least one transmitter located in the retail environment and the processor analyses the received wireless signals and determines at least a location of the device within the retail environment, and wherein at least one transmitter is located at a predetermined choke point within the retail environment past which the shopping trolley or the like must travel before leaving through the exit and/or entrance.

According to a fourth aspect of the present invention, there is provided a security system for a retail environment including a merchandise display area, at least one entrance and at least one exit (which may be the same as the entrance), and at least one shopping trolley or the like, wherein the shopping trolley is fitted with a security device comprising a wireless receiver incorporating a processor, wherein the receiver is adapted to receive wireless signals from at least one transmitter located in the retail environment and the processor is adapted to analyse the received wireless signals so as to determine at least a direction of travel of the device relative to the at least one transmitter.

According to a fifth aspect of the present invention, there is provided a method of providing security in a retail environment including a merchandise display area, at least one entrance and at least one exit (which may be the same as the entrance), and at least one shopping trolley or the like, wherein the shopping trolley is fitted with a security device comprising a wireless receiver incorporating a processor, wherein the receiver receives wireless signals from at least one transmitter located in the retail environment and the processor analyses the received wireless signals so as to determine at least a direction of travel of the device relative to the at least one transmitter.

BRIEF DESCRIPTION OF THE DRAWINGS

For a better understanding of the present invention and to show how it may be carried into effect, reference shall now be made by way of example to the accompanying drawings, in which.

DETAILED DESCRIPTION OF THE INVENTION

Figure 1:
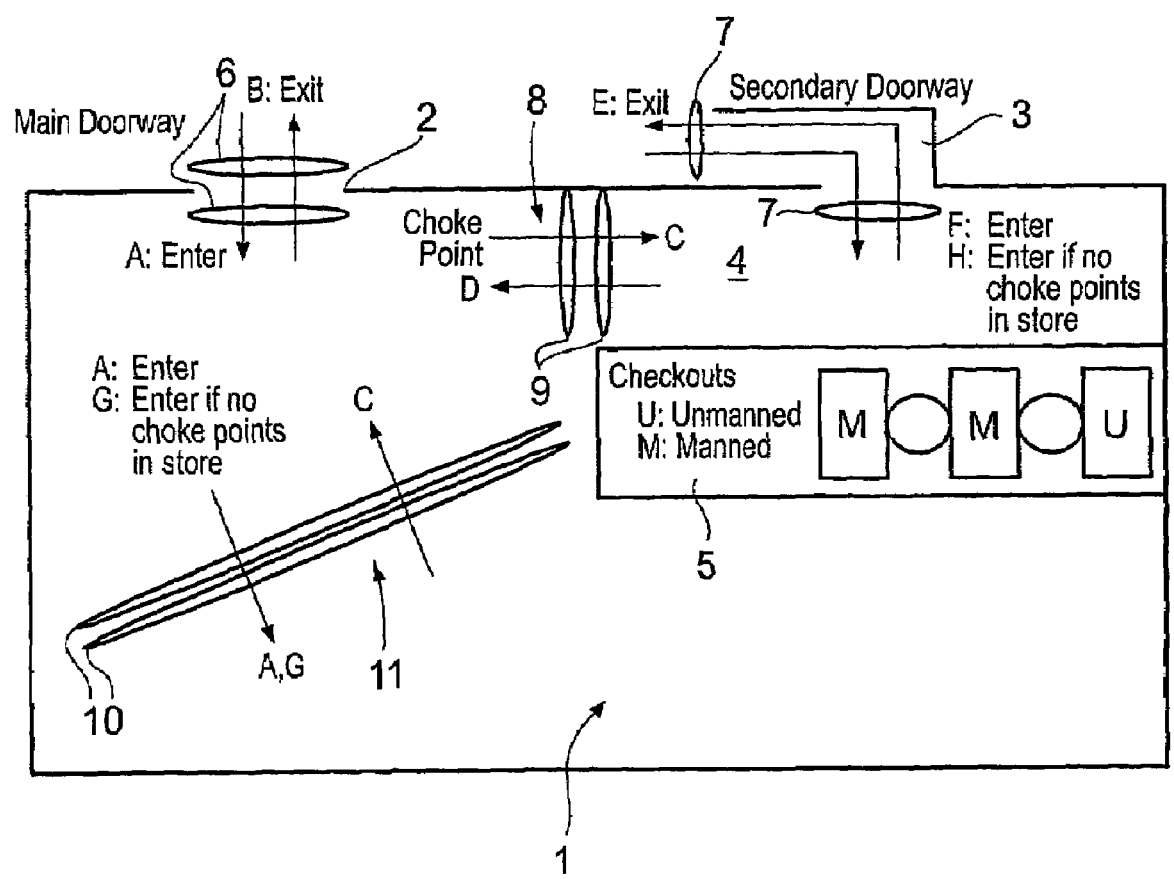
FIG. 1 shows a general layout of a typical retail environment.

The at least one transmitter and the receiver are preferably configured such that the receiver only receives signals when in close proximity to the at least one transmitter. For example, the transmitter and receiver may be adapted to communicate with each other only when a trolley fitted with a security device moves immediately past, over or under the transmitter.

The processor is preferably configured so as to issue an alarm signal when a predetermined signal or sequence of mutually identifiable signals is received from one or more transmitters. Detection of a predetermined signal or sequence of signals is indicative of a location of the shopping trolley and/or of a path taken by the shopping trolley through the retail environment. Certain locations and/or paths may be predetermined to be forbidden (because they indicate that a theft or push-out may be in progress).

The expression "merchandise display area" in the context of the present application is defined as that part of a retail store in which goods are displayed by a supermarket operator or the like for self-selection by customers, the customers generally placing the selected goods in a trolley for transport to a check out/payment location, generally located at an outer boundary of the merchandise display area In a modern retail environment, there will be additional areas outside the merchandise display area, for example a car park, toilet facilities, a restaurant or canteen and possibly other shops or stores located within the retail enviroment (for example between the check out/payment locations and the exit) but which are independent of the supermarket operator or the like (for example a pharmacy, a gift shop, a travel agency, a bank, a bakery, an electrical store, a franchise operation or any other outlet which rents retail space from an owner of the retail environment but which is substantially independent of the supermarket operator or the like that occupies the bulk of the retail environment and all of the merchandise display area). It is particularly advantageous to be able to monitor trolley movements and the like between these various areas and the merchandise display area and to cause issuance of an alarm signal if a particular sequence of "forbidden" movements is detected. For example, the alarm signal may be issued at an exit from the retail environment in the event that the security device detects that it has passed through an entrance, moved through at least a part of the merchandise display area, then into a canteen area, and then to the exit without having passed a check out/payment point.

The choke point is a point within the retail environment advantageously located outside the merchandise display area in a region between the check out/payment point or points and the at least one exit, the point being chosen so that all shopping trolleys or the like that have passed properly through a check out/payment point must pass the choke point on their way to the exit, which will generally also be provided with at least one transmitter. The alarm device on a shopping trolley will not be triggered if the trolley has passed the choke point before going through the exit, but will be triggered if the trolley has not passed the choke point. By selecting such a choke point, it is possible to operate the security arrangements of the present invention without requiring a dedicated transmitter or the like at each check out/payment point (for example in each check out aisle) as required by conventional systems. In this way, significant savings in the cost of infrastructure are achieved—typically around £5,000 for a store with thirty check out aisles. The functionality of the choke point will be discussed in more detail hereinbelow. However, in some embodiments, it is preferred to utilise a transmitter at a choke point in addition to transmitters at one or more check out aisles.

A choke point may additionally or alternatively be located at a boundary between the merchandise display area and a canteen facility or toilet facility (for example) in such a way that shopping trolleys or the like are forced to pass the choke point when passing between the merchandise display area and one or other of the canteen or toilet facilities. Such a choke point may be provided with a transmitter adapted to emit a different signal or signals to that of a transmitter located at a choke point between a check out/payment point and an exit. In particular, the canteen or toilet choke point transmitter should not emit a signal indicating to the security device that a customer has paid when that customer has not, since otherwise a dishonest customer may be able to exit the retail environment directly from the canteen (for example) without paying. In other words, a transmitter located at a canteen or toilet choke point preferably does not issue a "credit" signal to the security device that would allow it to pass a transmitter located at an exit without triggering the alarm signal. The use of directional choke point transmitters enable a security device to know which way it passes a choke point, giving valuable information regarding customer behaviour. Furthermore, the security device may count the number of times it passes any particular choke point during its passage through the retail environment and act accordingly when passing an exit transmitter, for example.

Preferably, the security device further includes a transmitter adapted to transmit a signal to a separate wheel locking device provided on the shopping trolley or the like. The transmitter may be a low frequency (LF) transmitter and may be activated to transmit a signal to the wheel locking device when the receiver receives a predetermined signal from a given transmitter or a predetermined sequence of mutually identifiable signals from one or more transmitters. When this happens, the processor issues an alarm signal, which in this case causes the wheel locking mechanism to be activated. In this way, embodiments of the present invention may be retrofitted to shopping trolleys and the like already including a wheel locking device of the types discussed in the introduction to the present application or any other appropriate type of wheel locking device. This provides significant additional security for a retail environment already making use of trolleys fitted with existing wheel locking devices without requiring each trolley to be fitted with a new wheel locking device, thereby resulting in cost savings. Instead of using an LF transmitter or the like, the security device may be hard-wired to a wheel locking device. In preferred embodiments, the functionality of a pre-existing wheel locking system is retained even when embodiments of the present invention are retro-fitted to existing shopping trolleys or the like. Accordingly, existing wheel locking devices on shopping trolleys or the like will continue to be activated as normal when a shopping trolley passes over a signal cable located at a perimeter of the retail environment (e.g. the car park), but have additional functionality to enable the wheel locking device to be activated in a vicinity of a transmitter or the like, for example at an entrance or exit or at a check out/payment point.

Alternatively or in addition, when the processor issues an alarm signal indicative of detection of a predetermined signal or sequence of signals, the alarm signal may cause an audible, visual or other alarm device to be activated. The alarm device is preferably incorporated in or connected to the security device, and may comprise a buzzer, bell, siren, speaker or other sound generating device, and/or a lamp that may light or flash.

Where both a wheel locking device and an alarm device are provided, it is particularly advantageous for the alarm device to issue a warning signal shortly before the wheel locking device is activated. For example, a buzzer and/or a synthesised or prerecorded voice message may sound 10 seconds or so before the wheel locking device is activated, thus giving a shopper sufficient warning before the shopping trolley becomes immobile, thereby helping to prevent or reduce accidents caused by sudden braking. Use of a synthesised or prerecorded digital voice message relayed by way of a loudspeaker is particularly preferred, since such a message will be clearly understood by a customer and the technology required is relatively cheap and simple.

The processor of the security device is advantageously provided with electronic memory means. The memory means may be RAM, ROM, EPROM or any other appropriate memory means, and may advantageously be programmed with data relating to possible signals that may be transmitted by the at least one transmitter and with various courses of action to be implemented by the processor upon detection of particular signals or particular sequential orders of signals.

The transmitter may be in the form of an electromagnetic coil fitted into a floor, ceiling or wall of the retail environment. Alternatively or in addition, the transmitter may be in the form of an electromagnetic coil or other antenna arrangement fitted in a dedicated housing or the like, or combined with or formed as an existing EAS gate or the like.

In a particularly preferred embodiment, a transmitter located at the choke point may comprise at least two coils or antennas or the like. For example, there may be provided a pair of floor coils or a pair of ceiling coils. Where each of the at least two coils or antennas or the like is configured to transmit a mutually distinct signal, the processor in the security device mounted on the shopping trolley is able to determine a direction of travel or passage relative to the choke point.

Transmitters of the type described in the previous paragraph may alternatively or in addition be provided at locations within the retail environment other than the choke point. For example, such a transmitter may be located at an entrance or an exit door, and the processor of the security device may be configured to issue an alarm signal if it is attempted to push a shopping trolley incorporating a security device out of the entrance door and/or into the exit door. In this way, it is possible to enforce one-way doors or gates in a retail environment without the need for physical one-way barriers or the like.

It is to be appreciated that, in a typical installation, a transmitter at a choke point will not generally be adapted to cause the processor of the security device to issue an alarm signal. Instead, the transmitter at the choke point serves to provide the processor with information as to its position (and optionally its direction of travel) within the retail environment. Depending on this information, the processor is able to decide whether or not to issue an alarm signal when it passes a transmitter located, for example, at an entrance, exit or check out/payment point, or any other predetermined location in the retail environment.

The security device may additionally or alternatively be configured to count the number of times it passes a given transmitter. Knowledge of a direction of travel of a supermarket trolley past a given point and knowledge of a number of times within a predetermined time frame that the trolley passes the point gives valuable insight into customer behaviour, including potentially dishonest behaviour indicative of a theft or potential push-out.

The security device may advantageously include a timing mechanism in order to reduce the incidence of false alarms. It is feasible that an honest customer may arrive at a car park of the retail environment, leave his or her car, pick up a trolley and enter the merchandise display area past a transmitter located at an entrance thereof. The customer may then realise that he or she has left his or her money or credit cards in the car, and will then attempt to return to the car with the trolley through the entrance (but without having passed a payment point or a choke point) in order to retrieve the money or credit cards. It is clearly undesirable for the security device to issue an alarm signal in this event, especially if the alarm signal causes a wheel locking mechanism to be activated. Accordingly, the security device may be fitted with a timer configured to suppress issuance of an alarm signal for a predetermined time after the processor detects that it has entered the merchandise display area. The predetermined time may be set, for example, at five minutes or any other time calculated to provide a reasonable compromise allowing for indecisive but honest customer behaviour but not allowing too much time for a thief to fill a trolley with goods before attempting to leave the merchandise display area without paying.

The transmitters may be provided with means to change the characteristics of their emitted fields or signals in predetermined ways. For example, DIP (dual in-line package) switches may be provided in control circuitry of one or more of the transmitters so as to allow characteristics of an emitted signal to be changed in ways that are recognised by the processor of the security device. The processor and its memory means may be programmed to recognise a full range of different transmitter signals and to perform different actions as a result It is relatively cheap and easy to program the processor in this way. This provides an easy way of upgrading or reconfiguring a system of embodiments of the present invention without requiring major expenditure on additional infrastructure (such as new processors). For example, changes to a store layout may mean that a transmitter located at what was originally a choke point is no longer at a choke point, whereas a transmitter originally configured as an exit location transmitter may find itself located at a new choke point By configuring the transmitters so that their emitted field/signal characteristics can be changed with relative ease, it is not necessary to reprogram or replace the processors in all of the security devices.

In some embodiments, all or at least some of the transmitters may be controlled by way of a central computer or the like so as to enable all or some of the transmitters to issue a range of different wireless signals to the security devices. Alternatively or in addition, one or more of the transmitters may be controlled to issue different wireless signals upon reception of control signals from a hand-held remote control possible the same remote device as used to deactivating and/or resetting the alarm units). This allows a central operator to control the security devices remotely so as to achieve various functionalities. For example, one or more of the transmitters may be temporarily set to issue signals that trigger the alarm device and/or wheel locking mechanism of all shopping trolleys passing thereby. In a more sophisticated embodiment, a transmitter at a door may be controlled by security personnel so as to cause all shopping trolleys passing out through the door to lock, while allowing shopping trolleys passing in through the door to pass unimpeded.

Preferably, the alarm device of the security device may be deactivated and/or reset once it has been triggered. In order to avoid the alarm device from being deactivated or reset by dishonest customers or non-authorised personnel, there may be provided a remote device adapted to deactivate or reset the alarm device of any given security device. The remote device may comprise a hand-held unit adapted to issue a wireless electromagnetic signal that may be received by the receiver and processed by the processor of the security device so as to cause the alarm device to be deactivated and/or reset. The wireless electromagnetic signal may be modulated in a predetermined manner so as to comprise a coded signal that is difficult for a non-authorised person to replicate. In addition to deactivating and/or resetting the alarm device, the remote unit may also be used to reset the wheel locking mechanism where this is provided. Remote units may be issued to authorised security personnel or other authorised employees in the retail environment who will be able to investigate any alarms and to take appropriate action, including resetting triggered alarm devices and/or wheel locking mechanisms.

The remote device described hereinbefore may additionally be used to reprogram the security device by way of appropriately modulated transmissions. Alternatively or in addition, the security device may be reprogrammed by physically connecting a reprogramming device to the security device, possibly by way of a wire connection or the like to the processor. Alternatively or in addition, one or more of the transmitters located within the retail environment may be selectively controlled or adapted to emit appropriately modulated signals to the security device for reprogramming purposes. The security device may be reprogrammed so as to be adapted to changes in the layout of a retail environment or merchandise display area, to adapt to new transmitter locations and/or functionalities, to adjust a time delay between an alarm signal being issued and a wheel locking device being activated, or for any other appropriate purpose.

Each security device may additionally be adapted to count the number of times that a shopping trolley is used in the retail environment. This may be done by detecting appropriate transmissions from appropriate transmitters which allow the security device to monitor its movements within the retail environment (for example passing through an entrance and later passing through an exit). The number of times may be counted as a 16 bit number, for example. When this number exceeds a predetermined figure, for example 10,000, the security device may emit a wireless signal or otherwise give an indication (for example a visible or audible warning) that it is due to be serviced. This signal or indication may be emitted permanently until the security device is taken in for servicing, after which the count is reset. The count may be performed by the processor. The security device may also count the number of times that the alarm device is activated.

In a simple installation of embodiments of the present invention, there may be provided a transmitter (or a pair of transmitters) at a designated choke point, and transmitters (or pairs of transmitters) at each entrance and/or exit. If a trolley enters through an entrance, travels through the merchandise display area and then passes the choke point, the processor (by detecting signals in a predetermined order from the various transmitters) will allow the trolley to pass out of the exit without triggering the alarm device. On the other hand, if the trolley does not pass the choke point before passing out of the exit, the processor assumes that payment has not been made at the check out/payment location, and the alarm device will be triggered when a signal is received from the transmitter at the exit as the trolley passes thereby. In this simple installation, it is necessary for staff to monitor any unmanned check out/payment locations carefully so as to ensure that no trolleys pass thereby without payment being made.

In a more sophisticated installation, additional transmitters (or pairs of transmitters) may be installed at each check out/payment location, and a signal may be issued to the security device only when payment is made (for example by way of a check out operator activating the transmitter when payment is received). Only trolleys that have received this signal will then be allowed to pass through the exit. Alternatively, the transmitter at each check out/payment location may be adapted to issue a signal only when a conveyor belt at the location is in operation, or when a till is in operation. This means that no signal is received if the trolley is taken through an unmanned check out/payment location, and the trolley will then be prevented from passing through the exit.

FIG. 1 shows a plan view of a typical retail environment including a merchandise display area indicated generally at 1, a main doorway 2 and a secondary doorway 3. A lobby area indicated generally at 4 is provided between the doorways 2, 3 and the merchandise display area 1. A row of check out aisles 5 is provided between the lobby area 4 and the merchandise display area 1. The check out aisles 5 include manned check out aisles M at which a check out operator is present, and unmanned check out aisles U where no check out operator is present. Each check out aisle 5 may be provided with an appropriate transmitter (not shown), for example in the form of a floor coil or pair thereof. The unmanned check out aisles U may optionally be closed off with a releasable gate or barrier. It will be appreciated that when the retail environment is busy, all or most of the check out aisles 5 will be manned M, whereas when the retail environment is less busy, a number of the check out aisles 5 will be unmanned U. The main doorway 2 is provided with a pair of floor coils 6 acting as transmitters. In addition, the secondary doorway 3 is provided with a pair of floor coils 7 acting as transmitters. An optional choke point 8 is provided between the check out aisles 5 and the main doorway 2, the choke point 8 (where present) being provided with a pair of floor coils 9 acting as transmitters. There is additionally provided a pair of floor coils 10 forming a transmitter stretched across a main entrance/exit lobby forming a boundary 11 between the main doorway 2 and the merchandise display area 1, but which is otherwise not provided with physical barriers or the like. The boundary transmitter 11 may be configured as a choke point. A canteen facility may be located within the lobby area 4.

Various signals transmitted by the various transmitters to a security device of a shopping trolley or the like are indicated alphabetically in conjunction with directional arrows. For example, in a retail environment provided with choke points, a possible sequence of signals received by a security device on a trolley being operated by an honest customer may be: A (from floor coils 6)-A (from floor coils 10)-M (from a check out aisle transmitter)-D (from floor coils 9)-B (from floor coils 6). In a retail environment without choke points, an equivalent sequence of signals may be: G (from floor coils 6)-G (from floor coils 10)-M (from a check out aisle transmitter)-B (from floor coils 6).

The transmitters at the main doorway 2/boundary 11 and the secondary doorway 3 may respectively be set to give out signals A, F where choke points are present in the retail environment; and respectively to give out signals G, H where choke points are not present. The transmitters may be set by adjusting DIP switches or the like, or by any other means.

Figure 2:
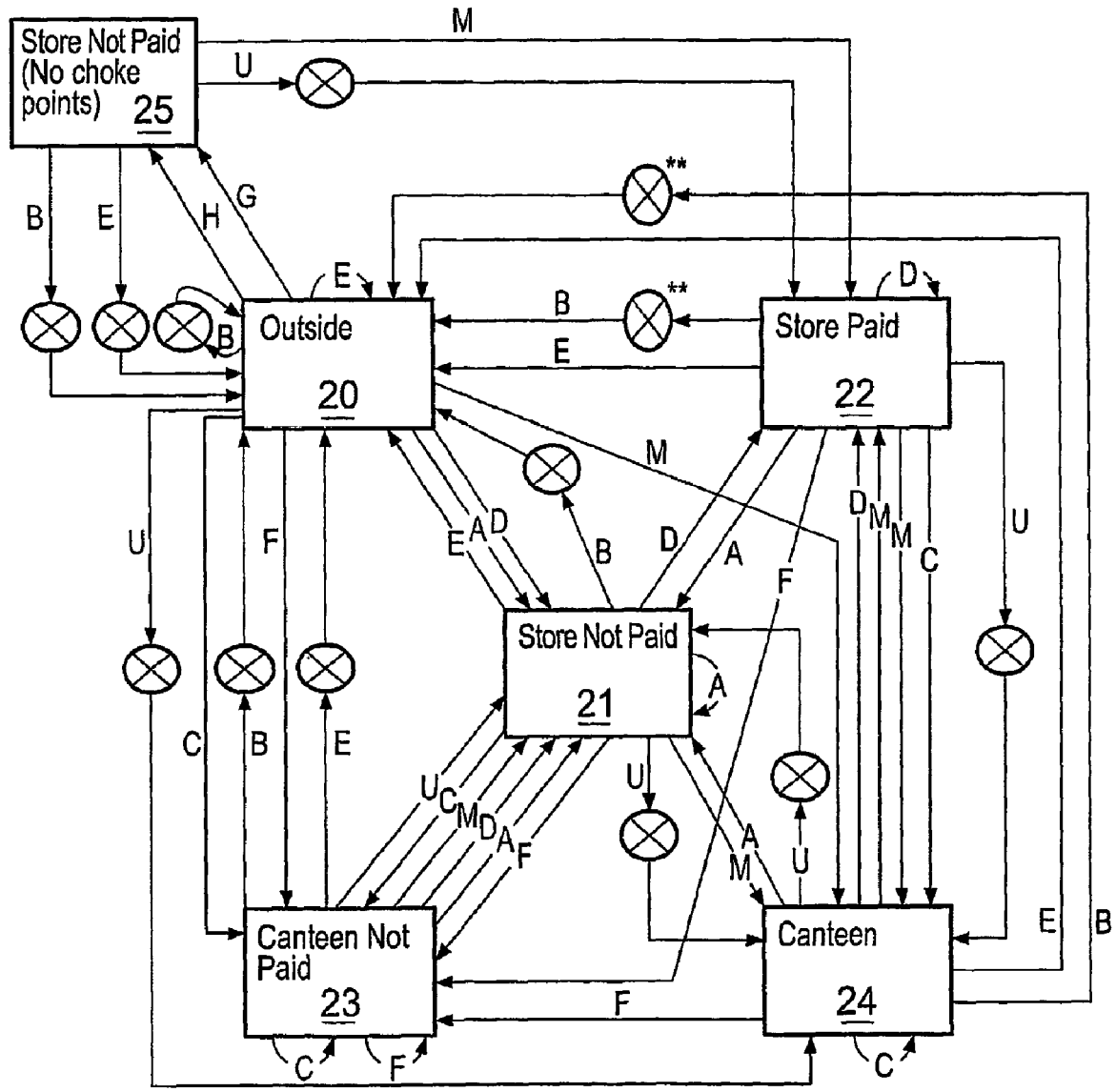
FIG. 2 is a state diagram illustrating possible usage patterns relating to embodiments of the present invention.

FIG. 2 shows a state diagram illustrating the possible movements of a trolley through the retail environment. The various "states" of a security device are set out in the boxes 20, to 25, and are set by way of the security device receiving predetermined signals or sequences of signals from one or more of the transmitters throughout the retail environment. Specifically, state "Outside" 20 is the operational state of a security device when outside the retail environment. State "Store not paid" 21 is the operational state of a security device when it detects that it is within the merchandise display area 1 but has not passed a manned check out M. State "Store paid" 22 is the operational state of a security device when it has passed a manned check out M and is within the retail environment and/or merchandise display area 1. State "Canteen not paid" 23 is the operational state of a security device when it detects that it is within the canteen facility 4 but has not passed a manned check out M. State "Canteen paid" 24 is the operational state of a security device when it detects that it is within the canteen facility 4 after passing a manned check out M. An optional state "Store not paid (no choke points)" 25 is the operational state of a security device when it detects that it is in the merchandise display area 1 of a retail environment without choke points, and has not yet passed a manned check out M. The possible state changes are indicated by arrows between the states with the relevant signals indicated appropriately. A cross on any arrow indicates that the particular change of state is forbidden and will generally trigger an alarm signal.

In general, every shopping trip will start with the security device of a shopping trolley being in the "Outside" state 20.

For a typical retail environment with choke points 8 but no boundary transmitter 11, a typical shopping trip by an honest customer will involve the security device of a shopping trolley detecting the following sequence of signals: A-M-D-B. A thief, on the other hand, might take a trip in which the signals received would be in the sequence: A-B. With reference to FIG. 2, it can be seen that, with the security device starting in state "Outside" 20, the received sequence A-M-D-B will set the security device to the following sequence of states: "Outside" 20—"Store not paid" 21—"Canteen paid" 24—"Store paid" 22—"Outside" 20, a sequence that is allowed by the state diagram. The received sequence A-B would give rise to: "Outside" 20—"Store not paid" 21—"Outside" 20, in turn triggering an alarm signal when the security device passes the transmitter at the main doorway 2. Following the alarm signal, the security device (once reset by security or store personnel) returns to the "Outside" 20 state ready for its next trip.

The security device is not always returned to the "Outside" 20 state after an alarm signal. For example, a detected signal sequence A-U (enter store and try to leave through an unmanned check out) will trigger the alarm signal. When the security device is reset by security personnel, it will be in the "Canteen paid" 24 state, and may leave the retail environment by the main doorway 2 (D-B) or by the secondary doorway 3 (E).

In a more complex shopping trip, a customer may enter through the main doorway 2, go to the canteen at 4, enter the merchandise display area 1, pay at a manned check out aisle S and leave through the secondary doorway 3. The detected sequence of signals will be: A-C-D-M-E. From FIG. 2, this is: "Outside" 20—"Store not paid" 21—"Canteen not paid" 23—"Store not paid" 21—"Canteen paid" 24—"Outside" 20. The first time that the customer is in the canteen in the lobby area 4, the state of the security device is "Canteen not paid" 23, and therefore leaving the retail environment by either the main 2 or secondary 3 doorway (B or E) to return to the "Outside" 20 state is forbidden and will trigger the alarm signal. The second time that the customer is in the canteen 4, the security device is in the "Canteen paid" 24 state, and thus may return freely to the "Outside" 20 state by way of the main 2 or secondary 3 doorway (B or E) without the alarm signal being triggered.

In a retail environment having both a choke point 8 and a boundary choke point 11, a typical trip may be: A-A-M-D-B. A thief may take the route: A-A-C-B. Starting in the "Outside" 20 state, the sequence A-A-M-D-B results in: "Outside" 20—"Store not paid" 21—"Store not paid" 21—"Canteen paid" 24—"Store paid" 22—"Outside" 20. FIG. 2 shows that this sequence is allowed. The sequence A-A-C-B results in: "Outside" 20—"Store not paid" 21—"Store not paid" 21—"Canteen not paid" 23—"Outside" 20. FIG. 2 shows that this sequence will result in an alarm signal at the main doorway 2 upon reception of signal B.

It can be seen that in the immediately preceding examples, the boundary choke point 11 has no effect. A trip that the boundary choke point 11 is designed to prevent may be: thief enters retail environment, enters merchandise display area 1, fills trolley with goods, pays at a manned check out aisle 5, re-enters merchandise display area 1, collects further goods (and hides these among goods that have been paid for) and leaves retail environment. The detected sequence of signals will be: A-A-M-D-A-C-B or "Outside" 20—"Store not paid" 21—"Store not paid" 21—"Canteen paid" 24—"Store paid" 22—"Store not paid" 21—"Canteen not paid" 23—"Outside" 20. This sequence triggers an alarm signal at the transition from "Canteen not paid" 23 to "Outside" 20 (B).

Two state transition pathways in FIG. 2 ("Store paid" 22—"Outside" 20 via B, and "Canteen paid" 24—"Outside" 20 via B) are shown as forbidden with double asterisks in the Figure. These state transitions are optionally forbidden in retail environments where a one-way door option is enforced (by way of appropriate configuration of the security device and/or the transmitters). In retail environments where no one-way door options are enforced, these transitions are allowed, Some unusual events are also set out in FIG. 2 for completeness. For example, when in the "Outside" 20 state, it is not logically possible to experience an E signal (i.e. leaving through the secondary doorway 3). Accordingly, an E signal keeps the security device in the "Outside" 20 state as a means of error handling.

The preferred features of the invention are applicable to all aspects of the invention and maybe used in any possible combination.

Throughout the description and claims of this specification, the words "comprise" and "contain" and variations of the words, for example "comprising" and "comprises", mean "including but not limited to", and are not intended to (and do not) exclude other components, integers, moieties, additives or steps.

The invention claimed is:

1. A security system for a retail environment including a merchandise display area, at least one exit or entrance, and at least one shopping trolley the system comprising a transmitter and a security device connected to the trolley, the security device comprising a receive-only wireless receiver incorporating a processor, wherein the receiver is adapted to receive wireless signals from the transmitter, the transmitter being located in the retail environment and wherein the processor is adapted to analyze the received wireless signals so as to determine at least a location of the device within the retail environment and to count a number of times the device passes a given transmitter, and wherein the transmitter is located at a predetermined choke point within the retail environment past which the shopping trolley must travel before leaving through the exit or entrance.

2. A security system for a retail environment including a merchandise display area, at least one exit or entrance, and at least one shopping trolley the system comprising a transmitter and a security device connected to the trolley, the security device comprising a wireless receiver incorporating a processor, wherein the receiver is adapted to receive wireless signals from the transmitter located in the retail environment and the processor is adapted to analyze the received wireless signals so as to determine at least a direction of travel of the device relative to the transmitter and to count a number of times the device passes a given transmitter.

3. A system as claimed in claim 1, wherein the processor is configured to issue an alarm signal when a predetermined signal or sequence of mutually identifiable signals is received from one or more transmitters.

4. A system as claimed in claim 3, wherein the security device further includes a transmitter, the transmitter being adapted to transmit a signal to a wheel locking device provided on the shopping trolley when the alarm signal is issued.

5. A system as claimed in claim 4, wherein the transmitter is a low frequency wireless transmitter.

6. A system as claimed in claim 3, wherein the processor is hard-wired to a wheel locking device provided on the shopping trolley and wherein the processor is adapted to transmit a signal to the wheel looking device when the alarm signal is issued.

7. A system as claimed in claim 3, wherein the alarm signal causes an audible, visual or other alarm device to be activated.

8. A system as claimed in claim 7, wherein the alarm device is configured to be activated in response to the alarm signal prior to activation of the wheel locking device.

9. A system as claimed in claim 3, further including a timing device configured to suppress or delay issuance of the alarm signal for a predetermined time.

10. A system as claimed in claim 1, wherein the processor is adapted to determine a direction of travel of the device past a given transmitter.

11. A system as claimed in claim 1, wherein the retail environment includes at least one check out point located between the merchandise display area and the at least one exit or entrance, and wherein the choke point is located outside the merchandise display area in a region between the at least one check out point and the at least one exit or entrance.

12. A system as claimed in claim 1, wherein the retail environment includes a canteen or a toilet facility located outside the merchandise display area, and wherein a choke point is provided at a boundary between the merchandise display area and the canteen or toilet facility.

13. A system as claimed in claim 1, wherein the transmitter includes a pair of coils or antennas, each of the pair being adapted to transmit a mutually distinct signal so as to enable the processor to determine a direction of travel of the security device relative to the transmitter.

14. A system as claimed in claim 1, wherein the transmitter located at the choke point is configured to transmit wireless signals to the wireless receiver that do not cause an alarm signal to be issued by the processor but instead provide location or direction of travel information.

15. A system as claimed in claim 1, wherein the transmitter is provided with means to change characteristics of the transmitted signals in predetermined ways that are recognized by the processor.

16. A system as claimed in claim 1, wherein a plurality of transmitters located in the retail environment are networked to a central computer.

17. A system as claimed in claim 1, further provided with at least one hand-held remote control device adapted to issue wireless control signals to the security device or the transmitter.

18. A method of providing security in a retail environment including a merchandise display area, at least one exit or entrance, and at least one shopping trolley the system comprising a transmitter and a security device connected to the trolley, the security device comprising, a receive-only wireless receiver incorporating a processor, wherein the receiver receives wireless signals from a transmitter located in the retail environment and the processor analyses the received wireless signals and determines at least a location of the device within the retail environment and counts a number of times the device passes a given transmitter, and wherein a transmitter is located at a predetermined choke point within the retail environment past which the shopping trolley must travel before leaving through the exit or entrance.

19. A method according to claim 18, wherein the processor issues an alarm signal when a predetermined signal or sequence of mutually identifiable signals is received from one or more transmitters.

20. A method according to claim 19, wherein the security device further includes a transmitter, the transmitter transmitting a signal to a wheel locking device provided on the shopping trolley when the alarm signal is issued.

21. A method according to claim 20, wherein the transmitter is a low frequency wireless transmitter.

22. A method according to claim 19, wherein the processor is hard-wired to a wheel locking device provided on the shopping trolley and wherein the processor transmits a signal to the wheel locking device when the alarm signal is issued.

23. A method according to claim 19, wherein the alarm signal causes an audible, visual or other alarm device to be activated.

24. A method according to claim 23, wherein the alarm device is activated in response to the alarm signal prior to activation of the wheel locking device.

25. A method according to claim 19, wherein a timing device suppresses or delays issuance of the alarm signal for a predetermined time.

26. A method according to claim 18, wherein the processor determines a direction of travel of the device past a given transmitter.

27. A method according to claim 18, wherein the retail environment includes at least one check out point located between the merchandise display area and the at least one exit or entrance, and wherein the choke point is located outside the merchandise display area in a region between the at least one check out point and the at least one exit or entrance.

28. A method according to claim 18, wherein the retail environment includes a canteen or a toilet facility located outside the merchandise display area, and wherein a choke point is provided at a boundary between the merchandise display area and the canteen or toilet facility.

29. A method according to claim 18, wherein the transmitter includes a pair of coils or antennas, each of the pair being adapted transmitting a mutually distinct signal so as to enable the processor to determine a direction of travel of the security device relative to the transmitter.

30. A method according to claim 18, wherein the transmitter located at the choke point transmits wireless signals to the wireless receiver that do not cause an alarm signal to be issued by the processor but instead provide location or direction of travel information.

31. A method according to claim 18, wherein the transmitter is provided with means to change characteristics of the transmitted signals in predetermined ways that are recognized by the processor.

32. A method according to claim 18, wherein a plurality all or at least some of the transmitters located in the retail environment are networked to a central computer.

33. A method according to claim 18, wherein there is provided at least one hand-held remote control device that issues wireless control signals to the security device and or the transmitter.

34. A method of providing security in a retail environment including a merchandise display area, at least one exit or entrance, and at least one shopping trolley the system comprising a transmitter and a security device comprising a wireless receiver incorporating a processor, wherein the receiver receives wireless signals from a transmitter located in the retail environment and the processor analyses the received wireless signals so as to determine at least a direction of travel of the device relative to the transmitter and counts a number of times the device passes a given transmitter.

35. A security device for a shopping trolley, the device comprising a receive-only wireless receiver incorporating a processor, wherein the receiver is adapted to receive wireless signals from a transmitter and the processor is adapted to analyze the received wireless signals so as to determine at least a location of the device within a predetermined spatial area and to count a number of times the device passes a given transmitter.

36. A device as claimed in claim 35, wherein the processor is configured to issue an alarm signal when a predetermined signal or sequence of mutually identifiable signals is received from one or more transmitters.

37. A device as claimed in claim 36, further including a transmitter, wherein the transmitter is adapted to transmit a signal to a wheel locking device provided on the shopping trolley when the alarm signal is issued.

38. A device as claimed in claim 37, wherein the transmitter is a low frequency wireless transmitter.

39. A device as claimed in claim 36, wherein the processor is hard-wired to a wheel looking device provided on the shopping trolley and wherein the processor is adapted to transmit a signal to the wheel locking device when the alarm signal is issued.

40. A device as claimed in claim 36, wherein the alarm signal causes an audible, visual or other alarm device to be activated.

41. A device as claimed in claim 40, wherein the alarm device is configured to be activated in response to the alarm signal prior to activation of the wheel locking device.

42. A device as claimed in claim 36, further including a timing device configured to suppress or delay issuance of the alarm signal for a predetermined time.

43. A device as claimed in claim 35, wherein the processor is adapted to determine a direction of travel of the device past a given transmitter.

* * * * *